July 29, 1930.  W. R. UGGLA  1,771,696

GEARING

Filed Nov. 9, 1925

W. R. Uggla
Inventor

By: Marks & Clerk
Attys

Patented July 29, 1930

1,771,696

UNITED STATES PATENT OFFICE

WILHELM ROBERT UGGLA, OF MORBY, STOCKSUND, SWEDEN, ASSIGNOR TO LUTH & ROSÉNE ELEKTRISKA AKTIEBOLAG, OF STOCKHOLM, SWEDEN, A CORPORATION OF SWEDEN

GEARING

Application filed November 9, 1925, Serial No. 67,952, and in Sweden October 8, 1924.

This invention relates to gearings of that class, in which one or more toothed wheels are yieldable peripherally for the effecting of perfect engagement of the teeth and a uniform running of the wheels with a slight wear of the same. The invention relates especially to gearings, in which the toothed rim of one or more wheels is slidable peripherally against the action of springs, which are located for instance, peripherally between projections provided on the said toothed rim and the hub. When the said or similar yieldable toothed wheels are used in gearings, in which the shafts have an upright position, the toothed rim has a tendency to sink, even if the toothed wheels are manufactured with very great accuracy, so that, when the teeth have an oblique position or are V-shaped, the rim occupies a slanting position, owing to the fact that the part of the toothed rim, which is located farthest from the toothed wheel, with which the toothed rim co-operates, will be located at a lower level than the part of the toothed rim, which engages the said wheel and the position of which is fixed by the same. In consequence the gearing does not operate in a wholly satisfactory manner but there is created a jamming between the teeth resulting in an increased wear of the gearing. For the removal of this drawback the toothed rim, according to this invention is supported vertically by a preferably adjustable yielding device, which is so adapted, that the rim is held in a correct position around its whole periphery, but notwithstanding has the possibility of sliding axially to some extent for its adjusting, if necessary, to the fixed teeth of the wheel, with which the rim co-operates.

Figure 1:
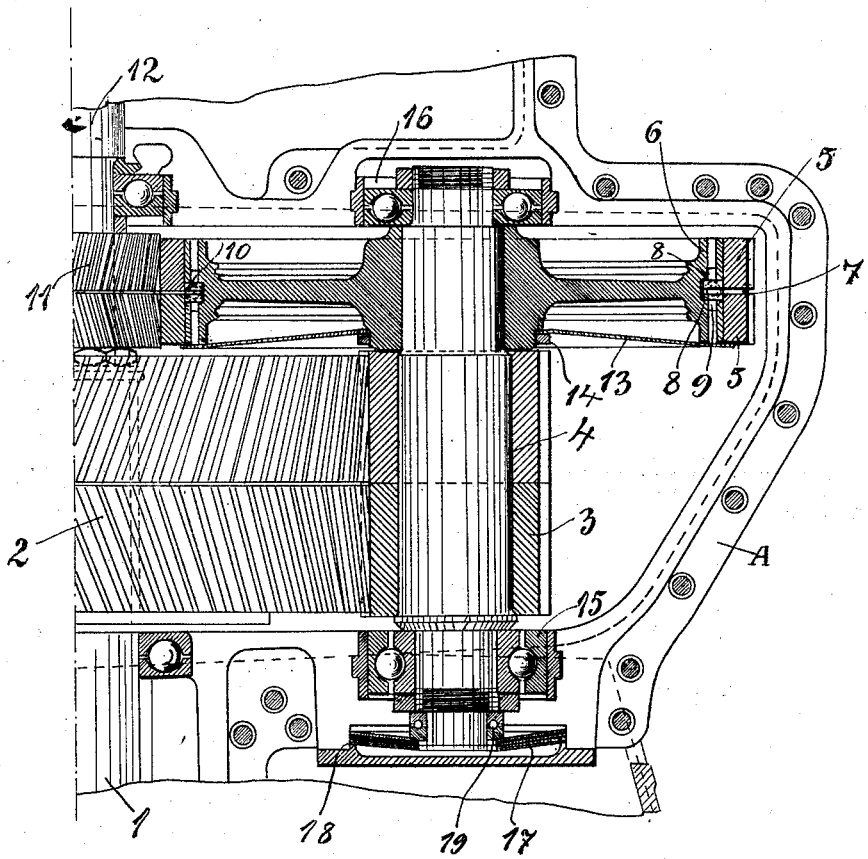

In the accompanying drawing Fig. 1 shows in a vertical section, partially in a side elevation a portion of a toothed gearing having upright shafts and arranged in accordance with this invention.

Figure 2:
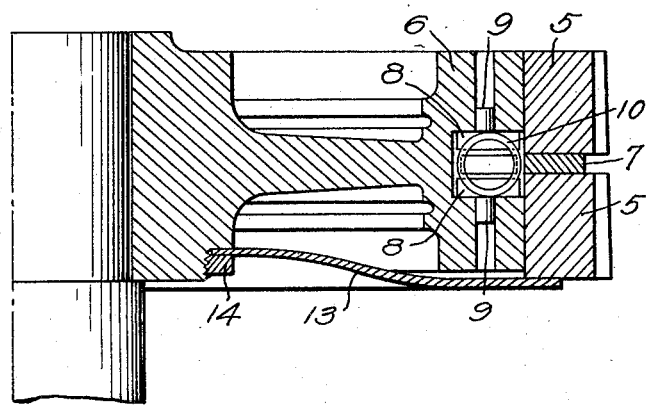

Fig. 2 shows in a vertical section and on a greater scale a part of a wheel provided with a peripherally yieldable rim yieldably supported vertically in accordance with the invention.

1 is the driving, vertical shaft provided with the toothed wheel 2, having V-shaped teeth and meshing with a pinion 3, which is fixed on a vertical shaft 4. On the said shaft 4 a second toothed wheel is fixed, provided with a yieldable toothed rim. The said yieldable toothed wheel may be of a known construction, such as described in my Patent No. 1,580,769, dated April 12, 1926, including a toothed rim 5, which is provided with V-shaped teeth and is movable peripherally on a rim 6 on the hub. Between the two parts of the rim 5 a ring 7, provided with inwardly extending projections is jammed, the said projections being located between two dies 8 respectively, which are provided with pins 9 extending into transversal holes in the rim 6 of the hub. Such sets of projections and dies are located on suitable places round the toothed wheel and between the sets helical springs 10 are located, which permit the rim 5 to yield peripherally or render the toothed wheel yieldable (see Fig. 2). Owing to the fact that there is a certain play between the said projections and dies, permitting the rim to yield peripherally, the said play will permit axial movement of the rim in some degree. The toothed rim 5 engages a pinion 11, fixed on an upright shaft 12 for the transmitting of the motion. Preferably, a second pair of toothed wheels (3, 5) is provided on the opposite side of the co-axial shafts 1 and 12, which wheels also mesh with the toothed wheels 2 and 11 respectively.

Owing to an unavoidable play between the parts of the yieldable toothed wheel the toothed rim 5 will not occupy a wholly correct position on the rim 6 of the hub but will drop on the same for some distance. Owing to the engagement of the toothed rim 5 with the V-shaped teeth of the pinion 11, however, the position of the left portion of the rim 5 is wholly fixed, while the right portion will drop for the reason stated, in consequence whereof the toothed rim 5 will occupy a slanting position. In some cases an automatic adjustment of the toothed rim 5 axially is necessary, in order that the position of the teeth of the rim 5 may be adjusted with relation to the teeth of the pinion 11. In order now to prevent the rim 5 from occupying a slanting position, which would result in the teeth of the rim 5 being jammed between the teeth of the pinion 11, the rim 5 is supported by a yieldable device, which in the form of execution shown in the drawing consists of a yieldable disc 13, which by means of screw-threaded ring 14 is fixed on the hub of the yieldable toothed wheel and at its outer edge supports the toothed rim 5. The tension of the disc is adjusted, for instance by means of the ring 14, so that the disc keeps the toothed rim 5 in the correct position. For the gaining of a correct engagement between the teeth of the rim 5 and the pinion 11 the said rim 5, however, is able to adjust itself vertically to some extent at the pinion 11 in consequence of the yieldable supporting device, while its substantially horizontal position is maintained. Owing to the said fact the rim 5 co-operates with the pinion 11 uniformly and without any jamming of the teeth.

Shaft 4 runs in ball bearings 15 and 16, which is the case also with other shafts of the gearing.

The yieldable device 13 may, evidently, be of any other suitable construction than the one shown in the drawing and may be used also in gearings with upright shafts and of a construction different from that described above.

I claim:

1. In a gearing the combination of substantially horizontal toothed wheels having V-shaped teeth, one of the wheels comprising a body, a toothed rim movable peripherally on said body and yieldable means interposed between said body and said rim, an axial guide provided on the body for the said rim and permitting the rim to move as a whole axially when acted upon by its weight, a yieldable member, and a support for the said member, said yieldable member sustaining freely and axially the said rim.

2. In a gearing the combination of substantially horizontal toothed wheels having V-shaped teeth, one of the wheels comprising a body, a toothed rim movable peripherally on said body, and yieldable means interposed between said body and said rim, a yieldable disc mounted concentrically with the said wheel, its periphery bearing freely against the lower side of said rim, and means for adjusting the tension of the said disc.

In testimony whereof I have hereunto affixed my signature.

WILHELM ROBERT UGGLA.